United States Patent
Olschewski

(10) Patent No.: US 7,218,762 B2
(45) Date of Patent: May 15, 2007

(54) METHOD FOR USER TRAINING FOR A SCANNING MICROSCOPE, SCANNING MICROSCOPE, AND SOFTWARE PROGRAM FOR USER TRAINING FOR A SCANNING MICROSCOPE

(75) Inventor: Frank Olschewski, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 593 days.

(21) Appl. No.: 10/369,960

(22) Filed: Feb. 18, 2003

(65) Prior Publication Data

US 2003/0155494 A1 Aug. 21, 2003

(30) Foreign Application Priority Data

Feb. 20, 2002 (DE) .................. 102 06 979

(51) Int. Cl.
G06K 9/00 (2006.01)

(52) U.S. Cl. .............. 382/128; 250/234; 356/300; 359/368

(58) Field of Classification Search ........ 382/128–134; 350/226, 340; 702/19, 21–23, 27, 28, 30, 702/31, 32, 68, 127, 172, 176, 189, 76; 356/300, 356/302, 303, 326, 73, 308, 317–319, 451, 356/939, 945; 250/227.18, 227.23, 234, 250/339.07, 390.07, 390.08, 340, 458.1, 250/459.1; 359/337.1, 368, 385, 389, 390; 378/43; 600/410

See application file for complete search history.

(56) References Cited

U.S. PATENT DOCUMENTS

| | | | | |
|---|---|---|---|---|
| 5,834,203 A | * | 11/1998 | Katzir et al. ............ | 435/6 |
| 6,078,681 A | * | 6/2000 | Silver ................... | 382/133 |
| 6,300,639 B1 | | 10/2001 | Wiederhoeft ........... | 250/458.1 |
| 6,483,103 B2 | * | 11/2002 | Engelhardt et al. ..... | 250/226 |
| 6,898,458 B2 | * | 5/2005 | Zeng et al. ............. | 600/476 |
| 6,996,492 B1 | * | 2/2006 | Testoni ................. | 702/134 |

FOREIGN PATENT DOCUMENTS

| | | |
|---|---|---|
| DE | 199 44 355.6 | 3/2001 |
| DE | 100 57 948 | 7/2001 |
| WO | WO 01/54052 | 7/2001 |

* cited by examiner

Primary Examiner—Jingge Wu
Assistant Examiner—Abolfazl Tabatabai
(74) Attorney, Agent, or Firm—Simpson & Simpson, PLLC

(57) ABSTRACT

A method for user training for a scanning microscope makes possible rapid setting of a scanning microscope with little specimen impact. It is possible to acquire an entire spectrum of a specimen. This specimen can be retrieved from the memory of the computer system for training purposes. The user can then make changes in the setting capabilities displayed to him on the user interface and assess the result thereof, also on the user interface. This can be done without time pressure until the user is satisfied with the result displayed on the user interface.

14 Claims, 6 Drawing Sheets

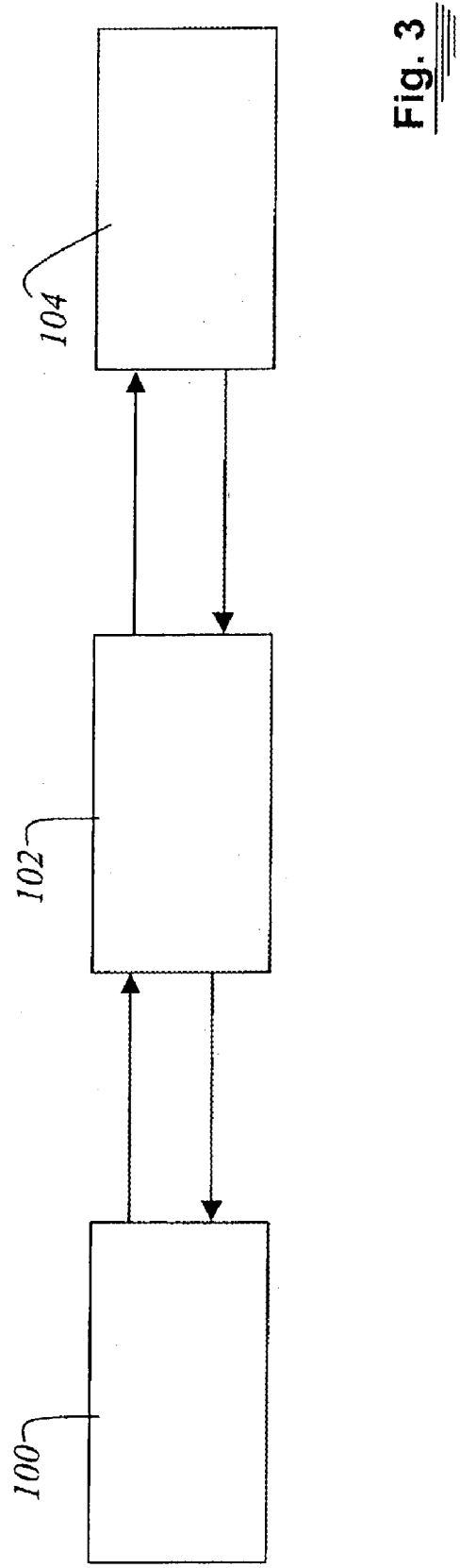

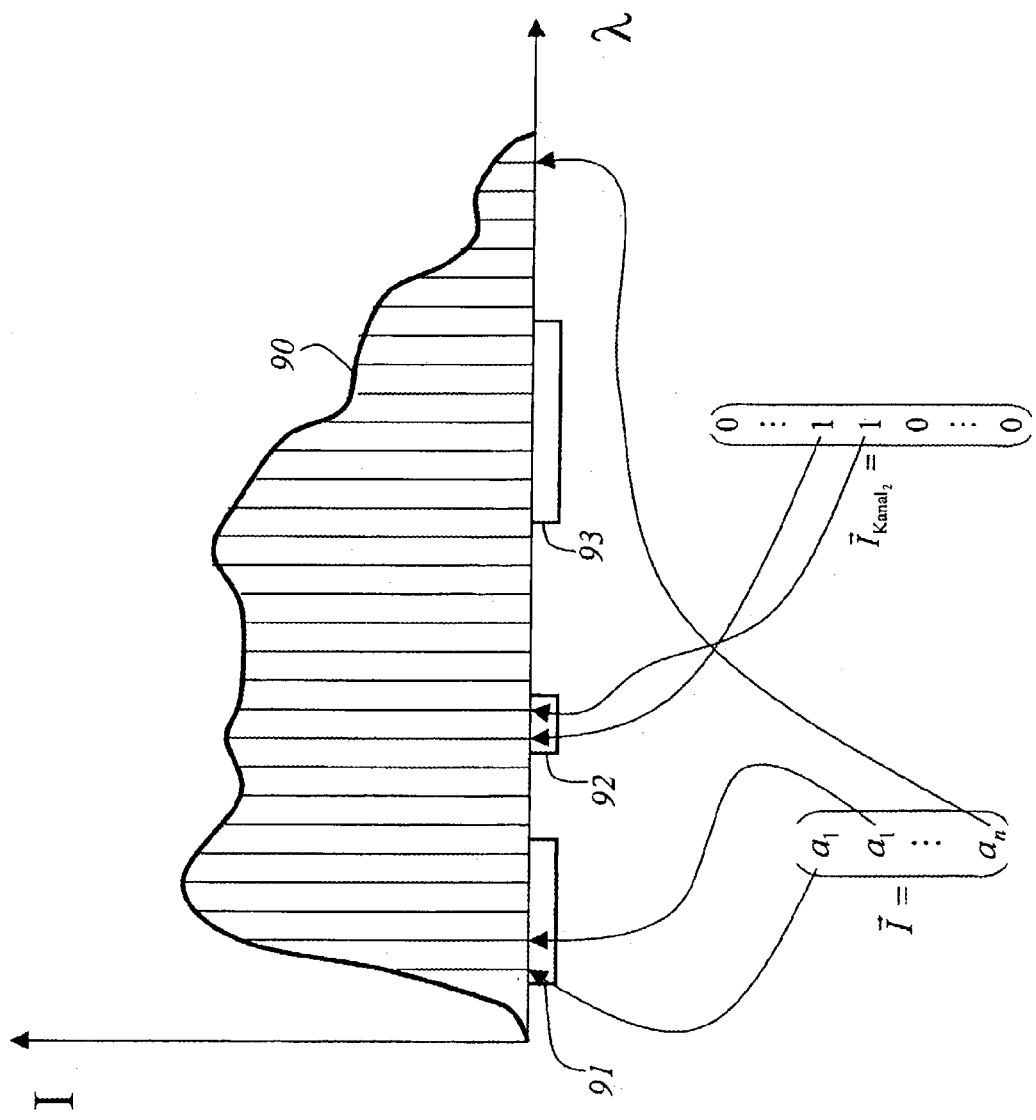

METHOD FOR USER TRAINING FOR A SCANNING MICROSCOPE, SCANNING MICROSCOPE, AND SOFTWARE PROGRAM FOR USER TRAINING FOR A SCANNING MICROSCOPE

CROSS REFERENCE TO RELATED APPLICATIONS

This application claims priority of the German patent application 102 06 979.4, filed Feb. 20, 2002, which is incorporated by reference herein.

FIELD OF THE INVENTION

The invention concerns a method for user training for a scanning microscope. The invention furthermore concerns a scanning microscope and finally the invention also concerns a software program for user training for a scanning microscope.

BACKGROUND OF THE INVENTION

Microscopes, in particular scanning microscopes, use specimens for training purposes that are not usable for further examinations due to radiation stress (e.g., bleaching, thermal damage, etc.). Optimum setting (parameter setting) of a scanning microscope is often time-consuming for an unpracticed user. A specimen can rapidly be destroyed or become unusable if the wrong parameters are selected. Since the production of specimens for microscopic examination requires a large expenditure of both time and money, the disadvantage of existing systems is that specimens are also used up in user training, without thereby obtaining experimental results or data. The parameters include e.g., the intensity of the individual laser lines irradiated onto the specimen, and also the regions of an acquired spectrum to be employed for analysis and image generation. In addition, in cases where an acousto-optical beam splitter (AOBS) is used, parameters of the AOBS corresponding to the selected wavelength must also be set.

German Patent Application DE 199 44 355.6 discloses an optical arrangement in the beam path of a laser scanning microscope. A spectrally selective element is provided which couples excitation light of the light source, of at least one wavelength, into the microscope. The excitation light scattered and reflected out of the detected beam path at a specimen is blocked, and the detected light coming from the specimen is not. The spectrally selective element can be an acousto-optical tunable filter (AOTF), an acousto-optical modulator (AOM), or an acousto-optical beam splitter (AOBS).

German Patent Application DE 100 06 800.6, which corresponds to U.S. Pat. No. 6,483,103 discloses an apparatus for selection and detection of at least one spectral region of a spectrally spread light beam (SP module). Selection means that are embodied as sliders are provided in the spread light beam in order thereby to direct portions of the spread light beam to different detectors. The signals of the detectors are then used for image generation. The quality of the image here depends in particular on the position of the slider. For an inexperienced user, it is time-consuming to find and set the best position.

Neither of the two documents cited discloses a training concept that trains a user in terms of setting the various parameters quickly and without being dependent on the microscope itself

SUMMARY OF THE INVENTION

It is the object of the invention to create a method with which a user can learn the settings of a scanning microscope without thereby consuming specimens and resources.

The object is achieved by way of a method that comprises the steps of:
retrieving a complete spectral scan from a memory of the computer system;
b) simulating a spectral selection, wherein the user defines several channels from the complete spectral scan;
c) adjusting a spectral selection means on a real microscope system and the computer system simulates an optical separation of the several channels;
d) generating and displaying an image for each channel, defined by the user; and
e) repeating the above steps c) through e) until the generated images correspond to an information content determined or desired by the user.

A further object of the invention is to create a scanning microscope with which an improvement in the training and practice capabilities of a spectral confocal microscope can be achieved, together with a cost saving.

The above object is achieved by way of a scanning microscope that has the following features:
means for acquisition of a complete spectral scan of a specimen,
spectral selection means cooperating with the means for acquisition,
a computer system having a memory for storing the complete spectral scan in the memory of the computer system,
a simulator module with which the specific channels of the complete spectral scan, and
a display associated with the computer system presents a spectral selection to a user.

An additional object of the invention is to create a software program with which it is possible to conduct user training for a scanning microscope with a virtual scanning microscope (i.e. an exclusively software-based learning of the settings).

The object is achieved by way of a software program on a data medium, wherein the software program executes, on a commercially available computer system, a user training system for a scanning microscope.

The invention has the advantage that after a specimen has been subjected once to radiation stress, it is possible to play with the characteristics of the specimen—and to learn—without inflicting further damage. Also possible for this purpose is a demo variant which reads the data set from a memory (hard drive, RAM, CD-ROM). This greatly minimizes training time on a confocal scanning microscope, and reduces stress on expensive specimens.

For unknown specimens, e.g. specimens that exhibit considerable autofluorescence, or in the case of mutants (manipulated by genetic engineering and equipped with a fluorescent label), it is also possible to begin with the lambda scan and then work experimentally toward the best conditions for proceeding later during experiments. This has a high level of customer benefit. After optimum interactive setting on the basis of the acquired spectrum, the values can be loaded directly into the SP module so that optimally good images can be made with that data set.

The operating principle of an SP module is relatively exactly adapted to the operating principle of the real SP module by mathematical simulation. The operating principles can be transferred into the software level by simulation. There, however, they automatically become a kind of inverse filters or the like (this depends a little on the mathematical nomenclature). The true value of the software module becomes apparent when the AOBS is also integrated into the configuration of the scanning microscope.

Further advantageous embodiments of the invention are evident from the dependent claims.

BRIEF DESCRIPTION OF THE DRAWINGS

The subject matter of the invention is depicted schematically in the drawings and will be described below with reference to the Figures, in which:

FIG. 3 schematically depicts the microscope in interaction with the software program and the simulator, FIG. 4a schematically depicts a portion of the user interface with which the user can make the settings for the scanning microscope;

FIG. 5 graphically depicts a complete spectrum, an allocation of the vectors necessary for calculation being depicted.

DETAILED DESCRIPTION OF THE INVENTION

Figure 1:
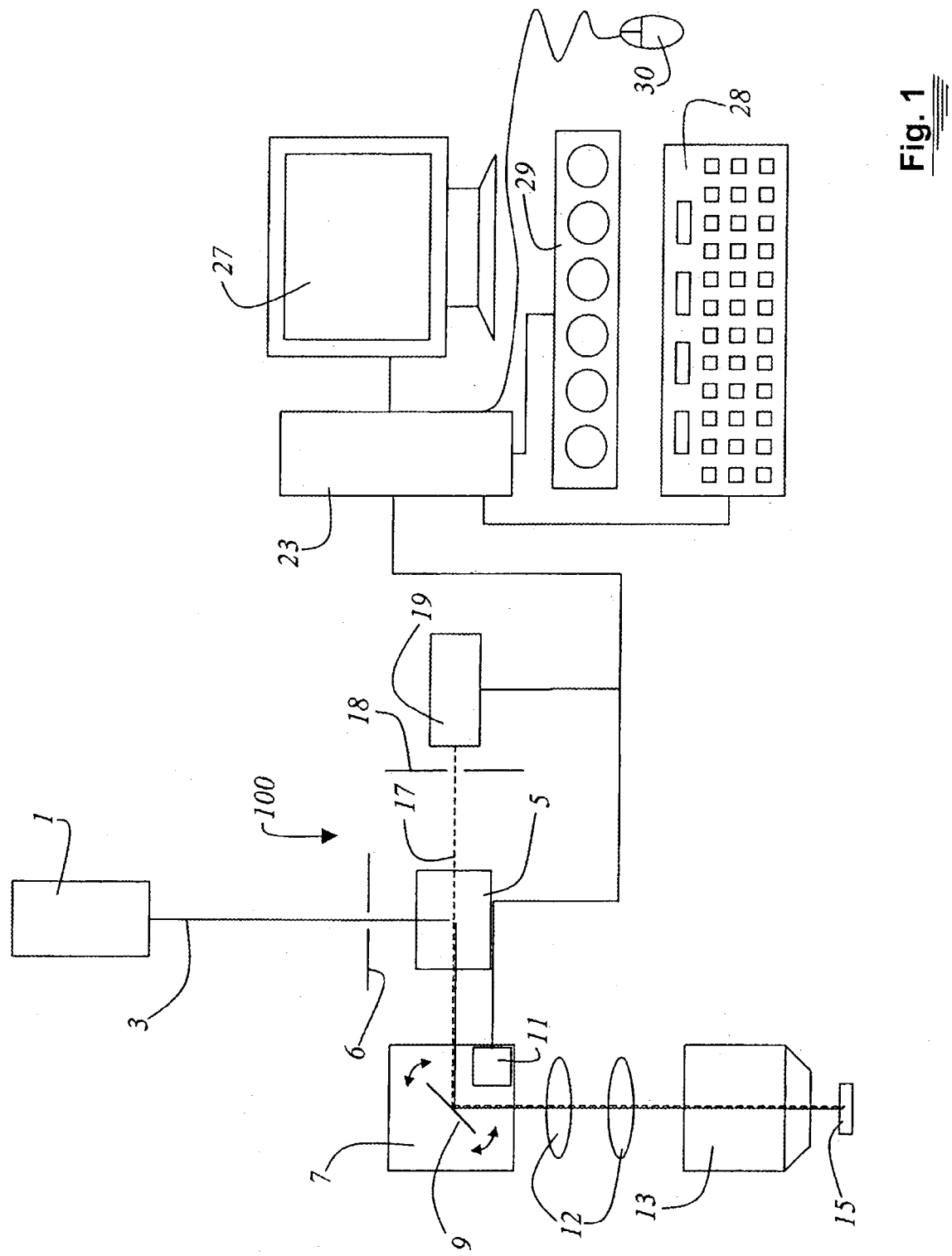
FIG. 1 schematically depicts a scanning microscope.

FIG. 1 schematically shows an exemplary embodiment of a confocal scanning microscope 100. This is not, however, to be construed as a limitation of the invention. It is sufficiently clear to one skilled in the art that the invention can also be implemented with a conventional scanning microscope. Illuminating light beam 3 coming from at least one illumination system 1 is directed, by a beam splitter or a suitable deflection means 5, to a scanning module 7. Before illuminating light beam 3 strikes deflection means 5, it passes through an illumination pinhole 6. Scanning module 7 encompasses a gimbal-mounted scanning mirror 9 that guides illuminating light beam 3 through a scanning optical system 12 and a microscope optical system 13 and over or through a specimen 15. In the case of non-transparent specimens 15, light beam 3 is guided over the specimen surface. With biological specimens 15 (preparations) or transparent specimens, light beam 3 can also be guided through specimen 15. For these purposes, non-luminous preparations are prepared, if applicable, with a suitable dye (not depicted, since it is established existing art). This means that different focal planes of the specimen are scanned successively by illuminating light beam 3. A position sensor 11 that determines the positional data of the acquired image data is connected to scanning module 7. Subsequent combination of the positional data and image data then yields a two-or three-dimensional frame (or image) of specimen 15. Illuminating light beam 3 coming from illumination system 1 is depicted as a solid line. The light proceeding from specimen 15 defines a detected light beam 17. This travels through microscope optical system 13, scanning optical system 12, and via scanning module 7 to deflection means 5, passes through the latter, and arrives via a detection pinhole 18 at least one detector 19, which is embodied as a photomultiplier. It is clear to one skilled in the art that other detection components, e.g. diodes, diode arrays, photomultiplier arrays, CCD chips, or CMOS image sensors, can also be used. Detected light beam 17 proceeding from or defined by specimen 15 is depicted in FIG. 1 as a dashed line. In detector 19, electrical detected signals proportional to the power level of the light proceeding from specimen 15 are generated. Since light of only one wavelength is emitted from specimen 15, it is advisable to insert in front of the at least one detector 19 a selection means 21 for the spectrum proceeding from the specimen. The data generated by detector 19 are forwarded to a computer system 23. At least one peripheral device 27 is associated with computer system 23. The peripheral device can be, for example, a display on which the user receives instructions for setting the scanning microscope or can view the current setup and also the image data in graphical form. Also depicted on the display is, for example, a user interface such as the one shown e.g. in FIG. 4. Additionally associated with computer system 23 is an input means that comprises e.g. a keyboard 28, a setting apparatus 29 for the components of the microscope system, and a mouse 30.

Figure 2:
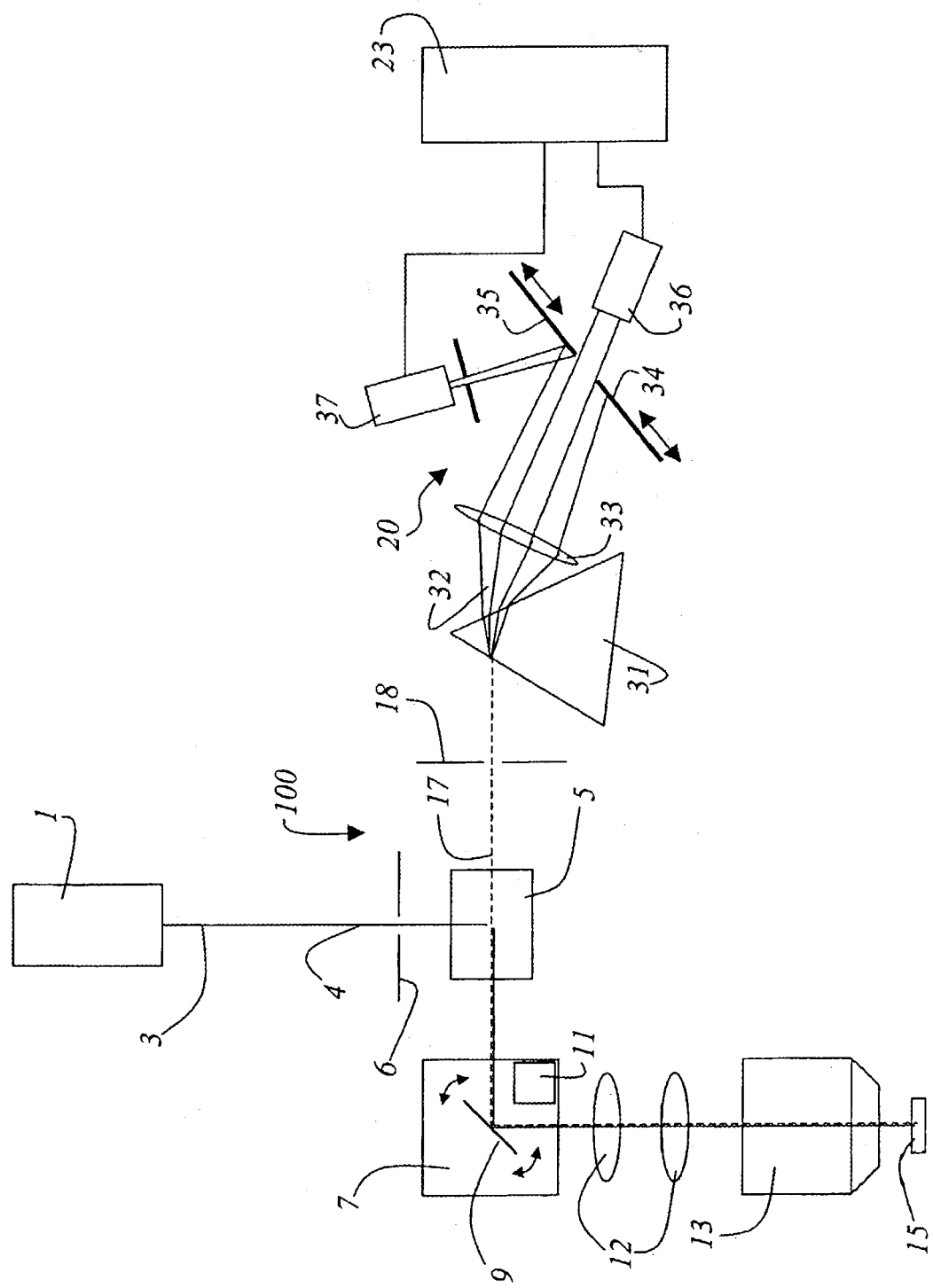
FIG. 2 schematically depicts a scanning microscope, an SP module being placed in front of the detector.

FIG. 2 shows the embodiment of a scanning microscope in which an SP module 20 is arranged in front of the at least one detector 19 as selection means. All the other elements shown in FIG. 2 conform to those of FIG. 1, and therefore need not be mentioned again in the description of FIG. 2. SP module 20 (FIG. 2) acquires a complete lambda scan; i.e. for each specimen point, all the wavelengths proceeding from specimen 15 are recorded. The data are transferred to computer system 23 and can then be displayed on display 27 in a manner definable by the user. Detected light beam 17 is spatially spectrally divided using a prism 31. A further possibility for spectral division is the use of a reflection or transmission grating. Spectrally divided light fan 32 is focused by focusing optical system 33, and then strikes a mirror stop arrangement 34, 35. Mirror stop arrangement 34, 35, the means for spatial spectral division (prism 31), focusing optical system 33, and detectors 36 and 37 are together referred to as SP module 20 (or the "multi-band detector"). As is evident from FIG. 4, by means of mirror stop arrangement 34, 35 a desired portion of the spectrum can be selected. To do so, the user displaces sliders on the user interface which brings about, in SP module 20, an adjustment of mirror stop arrangement 34, 35 corresponding to the selection. A portion of divided light fan 32 of detected light beam 17 which contains only light of the selected spectral region passes through mirror stop arrangement 34, 35 and is detected by detector 36, which is embodied as a photomultiplier. Another portion of divided light fan 32 is reflected at mirror stop arrangement 35 and travels to detector 37, which is also embodied as a photomultiplier. Mirror stop arrangements 34, 35 are displaceable in the directions illustrated by the double arrows, so that the spectral detection regions of the light conveyed to detectors 36, 37 are continuously adjustable. It is possible (although not depicted for reasons of clarity) to install even more detectors and additional mirror stops. In detectors 36, 37, electrical detection signals are generated that are proportional to the power level, in the respective spectral region, of detected light beam 17 proceeding from specimen 15; in computer system 23, these are associated with the positional signals sensed in the beam deflection device by means of a position sensor.

FIG. 3 depicts the general configuration of the user training system for a scanning microscope 100. This user training system permits a user to learn the setting procedures for a scanning microscope 100 without requiring a specimen 15 for that purpose during the entire learning phase. A software module 102 that is of interactive configuration is connected to scanning microscope 100. The operating principle of SP module 20 (FIG. 2) is simulated in the special interactive software module 102, i.e. spectral bands are separated out from the data set, accumulated, combined into channels, and depicted in multicolor fashion. All the capabilities of the software of a confocal scanning microscope are thus taken into account. In principle, the software program then looks like a user interface (see FIG. 4). With SP module 20, a high-quality spectral intensity vector $\vec{I}$ is acquired for each pixel (see Equation 1), as follows:

$$\vec{I} = \begin{pmatrix} I_1 \\ \vdots \\ I_n \end{pmatrix}, I_i = \int_{\lambda_{min}+i\Delta\lambda}^{\lambda_{min}+(i+1)\Delta\lambda} I(\lambda) \qquad \text{Equation 1}$$

This corresponds to a complete spectral scan with SP module 20, the width of the scan being defined by the system design or the parameter setting. The dimensionality n of SP module 30 is unrestrictedly adjustable. The data supplied from scanning microscope 100, or a scan acquired with the scanning microscope, are retained in the RAM of computer system 23. Computer system 23 switches into a simulation mode of SP module 30. Connected to software module 102 for that purpose is a simulator 104 that displays to the user an accurate user interface having the standard components of the SP module operating software.

Figure 4A:
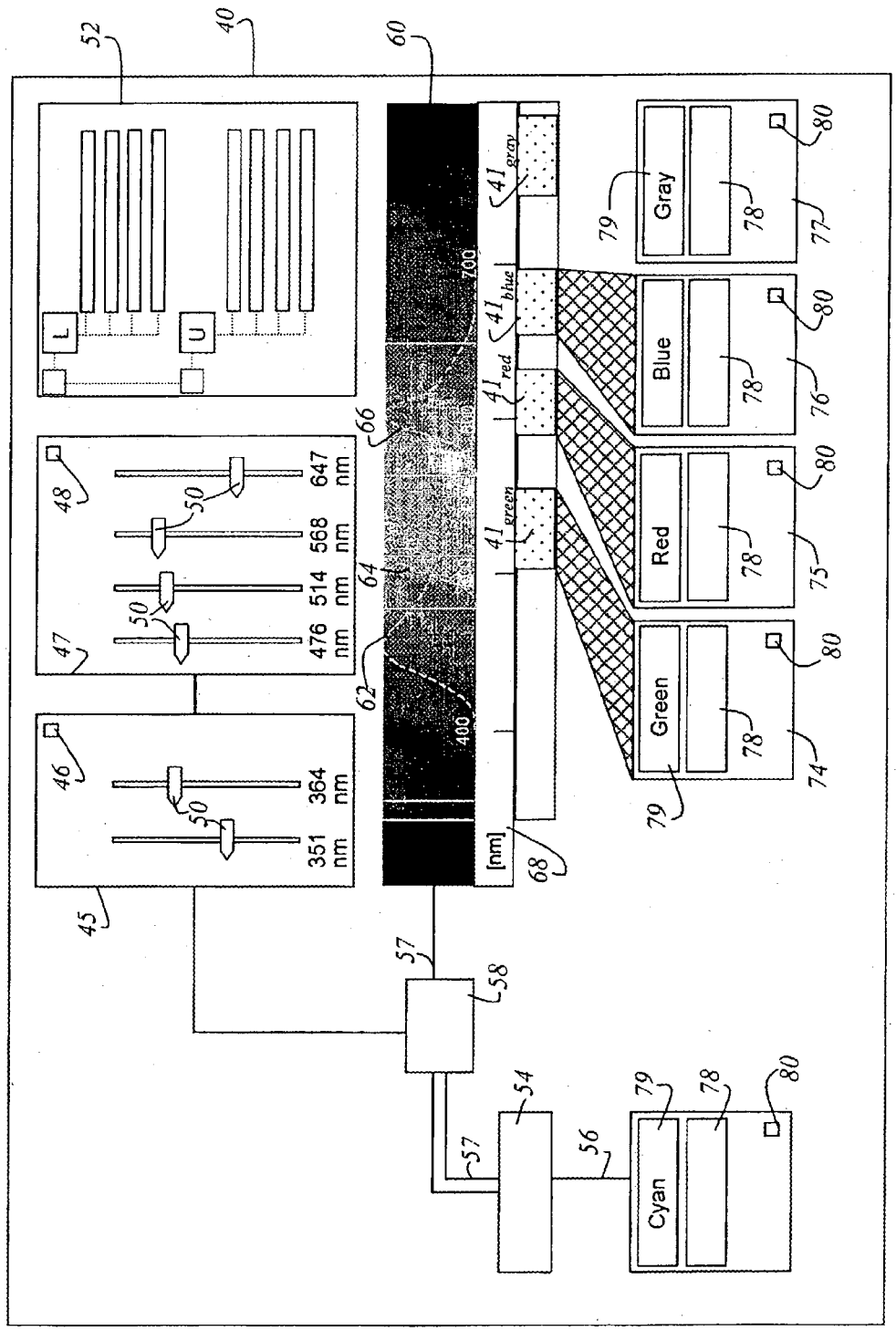
FIG. 4b schematically depicts another portion of the user interface, on which the results of the user's settings are presented to him in visual form.

FIG. 4a depicts a portion of a schematic embodiment of a user interface 40 (with which the user can define a number of desired channels. Depicted for this purpose on user interface 40 are selection sliders $41_{green}$, $41_{red}$, $41_{blue}$, or $41_{gray}$ with which the user can tune the various spectral bands. In a real system, the user adjusts a spectral band, and mirror sliders 34 and 35 in SP module 30 are moved as a consequence thereof. The result is that the spectral band is optically separated and displayed. The simulation is achieved by the fact that computer system 23 simulates this optical separation by generating for each desired channel a vector $\vec{I}_{Kanal}$ having the dimensionality of the aforementioned vector $\vec{I}$, by setting the values $I_i$ that lie in the selected band equal to one. For each desired channel, computer system 23 calculates an image, pixel by pixel, using the linear combination in equation 2:

$$I_{Kanal} = \frac{1}{\|\vec{I}_{Kanal}\|} \langle \vec{I}, \vec{I}_{Kanal} \rangle \qquad \text{(Equation 2)}$$

The calculated data for the channels are displayed to the user on display 27; any possible display mode (overlay, volume rendering, etc.) can be included in the depiction. To produce what is depicted on display 27, simulator 104 is connected to computer system 23 as shown in FIG. 3. Without stressing specimen 15 (thermally, with radiation, etc.), the user can take a correspondingly longer time until he is satisfied with the image shown on display 27. Pressing a button causes the setting to be stored and made available, as a filter macro or setting macro for SP module 30 for further work with the same specimen 15 or with similar specimens. In the portion of user interface 40 depicted in FIG. 4a, the scanning microscope is also schematically illustrated, and a number of setting capabilities are made available to the user. In the embodiment described, a first laser 45 and a second laser 47 are provided, each depicted schematically as a box. First laser 45 is e.g., an argon UV (ArUV) laser that emits light of a first wavelength of 351 nm and light of a second wavelength of 364 nm. Second laser 45 is e.g. an argon/krypton (ArKr) laser that emits light of a first wavelength of 476 nm, light of a second wavelength of 514 nm, light of a third wavelength of 568 nm, and light of a fourth wavelength of 647 nm. In each box, for each of the available wavelengths a slide controller 50 is provided, with which the proportional contribution of each wavelength to the laser power level can be adjusted. Also provided in each box is an indicator 46, 48 which provides information about the operating state of the respective laser and with which the laser can be switched on or off. Depicted next to the box for second laser 47 is a data structure 52 showing how the data are stored in the memory of computer 23. Also schematically depicted on the display are specimen 54 and a light beam 55 coming from lasers 45, 47, a light beam 56 transmitted by specimen 54, and a light beam 57 reflected from specimen 54. The light beams are correspondingly directed by a schematically depicted beam deflection device 58. Light beam 57 coming from specimen 54 contains a depiction of spectrum 60. The lines emitted by first and second lasers 45, 47 are plotted on spectrum 60. Also depicted in spectrum 60 is the intensity and the spectral position of light 57 reflected from specimen 54. In the exemplary embodiment depicted here, a first intensity curve 62, a second intensity curve 64 and a third intensity curve 66 are depicted in spectrum 60. Provided below spectrum 60 is a scale 68 that serves as an orientation aid for selection sliders $41_{green}$, $41_{red}$, $41_{blue}$, or $41_{gray}$ arranged therebelow. Selection sliders $41_{green}$, $41_{red}$, $41_{blue}$, or $41_{gray}$ are moved on user interface 40 using the mouse or a similar means. Below selection sliders $41_{green}$, $41_{red}$, $41_{blue}$, or $41_{gray}$, a first detector 74, a second detector 75, a third detector 76, and a fourth detector 77 are depicted, again schematically as boxes. A dye indicator 78 is provided in each box. Indicator 78 is configured as a drop-down indicator so that the user can easily select a different dye. Also associated with each box is a color identifier 79 which indicates how the signals of the respective detectors are being used for image generation on the display (see FIG. 4b). The operating state of each detector is indicated in each box by way of an activatable click box 80. A fifth detector 82, which also has indicator 78 for the dye detected by detector 82, the box for color identification 79, and activatable click box 80, is associated with the light transmitted by specimen 54.

Figure 4B:
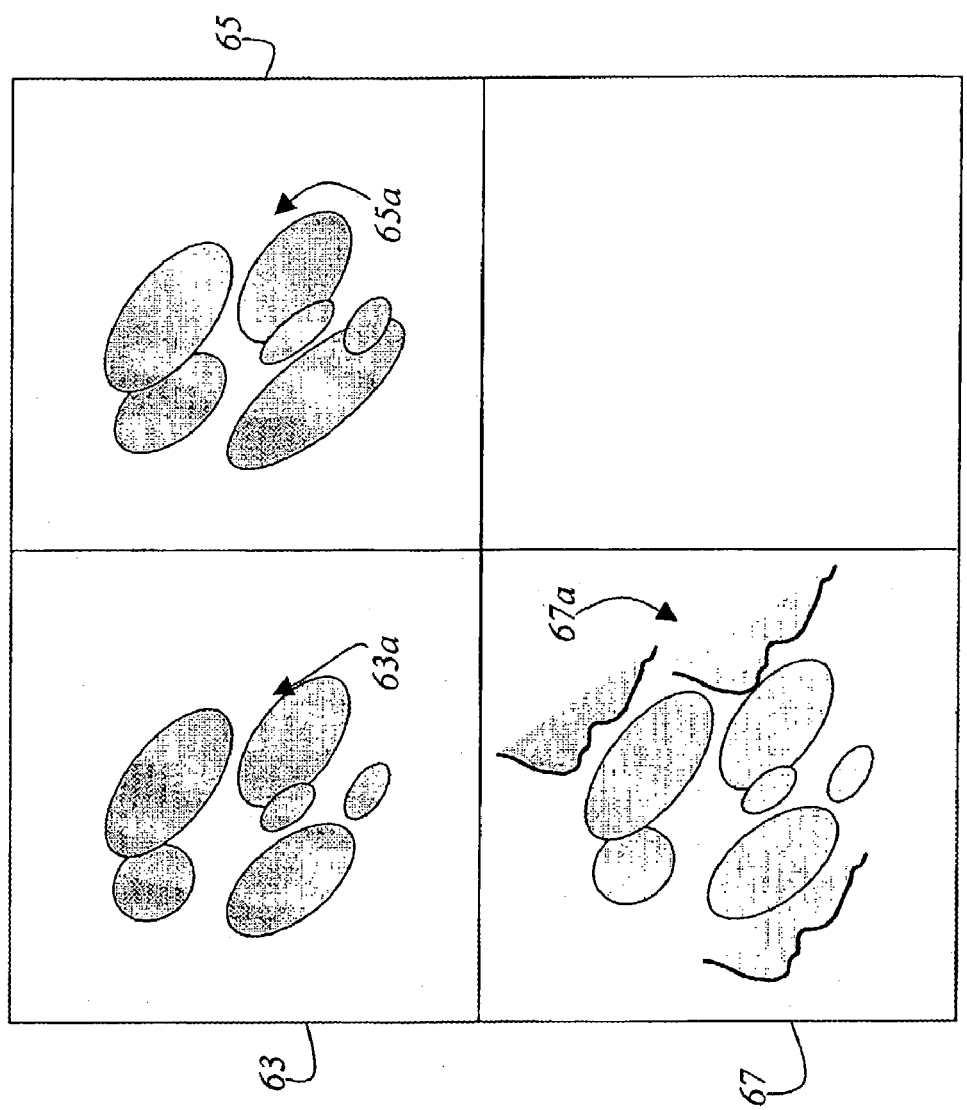

FIG. 4b depicts the images, from a real specimen or a virtual specimen, that are obtained when the user modifies selection sliders $41_{green}$, $41_{red}$, $41_{blue}$, or $41_{gray}$ on user interface 40 and thereby selects different regions of the spectrum for image generation. In the exemplary embodiment depicted here, the intensity acquired by first detector 74 is used to generate a green image 63. The intensity acquired by second detector 75 is used to generate a red image 65. The intensity acquired by third detector 76 is used to generate a blue image 67. It is self-evident that the images differ in that different or additional structures 63a, 65a, and 67a are visible in the respectively selected spectral regions.

In FIG. 5, intensity I is plotted as a function of wavelength $\lambda$. Spectrum 90 depicted in FIG. 5 can, for example, be generated by means of a lambda scan or can be retrieved from a database in which spectra 90 are stored for teaching purposes. Spectrum 90 can be depicted by a vector $\vec{I}$ having individual components $a_1$, $a_2$ through $a_n$ (n-dimensional). The selected regions of the spectrum are indicated below the abscissa, marked with a first, a second, and a third rectangle 91, 92, and 93. The simulation is achieved by the fact that computer system 23 simulates this optical separation by generating, for the channel or spectral region defined by second rectangle 92, the vector $\vec{I}_{Kanal2}$ having the dimensionality of the aforesaid vector $\vec{I}$. The values of $I_i$ that lie within second rectangle 92 are set to a value of one.

The invention has been described with reference to a particular exemplary embodiment. It is self-evident, however, that changes and modifications can be made without thereby leaving the range of protection of the claims below.

What is claimed is:

1. A method for user training for a scanning microscope, comprising the steps of:
   a) retrieving a complete spectral scan from a memory of the computer system;
   b) simulating a spectral selection, wherein the user defines several channels from the complete spectral scan;
   c) adjusting a spectral selection means on a real microscope system and the computer system simulates an optical separation of the several channels;
   d) generating and displaying an image for each channel defined by the user; and
   e) repeating the above steps c) through e) until the generated images correspond to an information content determined or desired by the user.

2. The method as defined in claim 1, wherein the steps:
   a) acquiring a complete spectral scan of a specimen; and
   b) storing the complete spectral scan in a memory of the computer system.

3. The method as defined in claim 1, wherein the simulation is performed on the basis of an SP module, there being displayed to the user, on a display associated with the computer system and an user interface having the standard components of the operating software for the SP module.

4. The method as defined in claim 3, wherein an interactive selection means depicted in the user interface are embodied as mirror sliders with which a band can be optically separated and displayed.

5. The method as defined in claim 1, wherein multiple display modes are incorporated for display purposes.

6. A method for user training for a scanning microscope, comprising the steps of:
   a) retrieving a complete spectral scan from a memory of the computer system;
   b) acquiring a high-quality spectral intensity vector $\vec{I}$ for each pixel, the equation $$\vec{I} = \begin{pmatrix} I_1 \\ \vdots \\ I_n \end{pmatrix}, I_i = \int_{\lambda_{min}+i\Delta\lambda}^{\lambda_{min}+(i+1)\Delta\lambda} I(\lambda)$$

corresponding to the complete spectral scan with the SP module, and $\Delta\lambda$ at the SP module being unrestrictedly adjustable;
   c) simulating a spectral selection, wherein the user defines several channels from the complete spectral scan;
   d) adjusting a spectral selection means on a real microscope system and the computer system simulates an optical separation of the several channels;
   e) generating and displaying an image for each channel defined by the user; and
   f) repeating the above steps c) through e) until the generated images correspond to an information content determined or desired by the user.

7. A method for user training for a scanning microscope, comprising the steps of:
   a) retrieving a complete spectral scan from a memory of the computer system;
   b) simulating a spectral selection, wherein the user defines several channels from the complete spectral scan;
   c) adjusting a spectral selection means on a real microscope system and the computer system simulates an optical separation of the several channels;
   d) generating and displaying an image for each channel defined by the user; and
   e) repeating the above steps c) through e) until the generated images correspond to an information content determined or desired by the user,
   wherein the simulation is performed on the basis of an SP module, there being displayed to the user, on a display associated with the computer system and an user interface having the standard components of the operating software for the SP module, wherein an interactive selection means depicted in the user interface are embodied as mirror sliders with which a band can be optically separated and displayed and wherein an optical separation is simulated by the computer system by generating for each desired channel a vector $\vec{I}_{Kanal}$ having the dimensionality of the high-quality spectral intensity vector $\vec{I}$, the components $\vec{I}_i$ of the spectral intensity vector $\vec{I}_{Kanal}$ that lie in the separated band being set equal to one.

8. The method as defined in claim 7, wherein for each desired channel, the computer system calculates an image, pixel by pixel, using the linear combination:

$$I_{Kanal} = \frac{1}{\|\vec{I}_{Kanal}\|} \langle \vec{I}, \vec{I}_{Kanal} \rangle.$$

9. A method for user training for a scanning microscope, comprising the steps of:
   a) retrieving a complete spectral scan from a memory of the computer system;
   b) simulating a spectral selection, wherein the user defines several channels from the complete spectral scan;
   c) adjusting a spectral selection means on a real microscope system and the computer system simulates an optical separation of the several channels;
   d) generating and displaying an image for each channel defined by the user; and
   e) repeating the above steps c) through e) until the generated images correspond to an information content determined or desired by the user,
   wherein during interactive user training, the simulated settings are transferred into a microscope control system as a configuration data set.

10. A scanning microscope comprising
    means for acquisition of a complete spectral scan of a specimen,
    spectral selection means cooperating with the means for acquisition,
    a computer system having a memory for storing the complete spectral scan in the memory of the computer system, a simulator module with which the specific channels of the complete spectral scan, and a display associated with the computer system presents a spectral selection to a user, wherein for each desired channel the computer system calculates an image, pixel by pixel, using the linear combination:

$$I_{Kanal} = \frac{1}{\|\vec{I}_{Kanal}\|} \langle \vec{I}, \vec{I}_{Kanal} \rangle,$$

a vector $\vec{I}_{Kanal}$ having the dimensionality of the high-quality spectral intensity vector $\vec{I}$ being generated for each desired channel, the components $I_i$ of the spectral intensity vector $\vec{I}_{Kanal}$ that lie in the separated band being set equal to one.

11. The scanning microscope as defined in claim 10, wherein multiple display modes are accessible for display purposes.

12. A scanning microscope comprising means for acquisition of a complete spectral scan of a specimen, spectral selection means cooperating with the means for acquisition, a computer system having a memory for storing the complete spectral scan in the memory of the computer system, a simulator module with which the specific channels of the complete spectral scan, and a display associated with the computer system presents a spectral selection to a user, wherein the simulator module encompasses a user interface, the user interface presenting the image of the acquired specimen to the user in a variety of display modes and schematically reproducing settable means of the scanning microscope system, the settable means being adjustable by way of input means of the computer system.

13. A computer readable medium storing a computer program for performing the steps of:

(a) executing a user training system for a scanning microscope on a commercially available computer system, wherein at least one complete spectral scan is present in a memory of the computer system;

(b) simulating a spectral selection, wherein the user defines several channels from the complete spectral scan;

(c) adjusting a spectral selection means on a real microscope system and the computer system simulates an optical separation of the several channels;

(d) generating and displaying an image for each channel defined by the user: and (e) repeating the above steps b) through d) until the generated images correspond to an information content interpreted as acceptable by the user.

14. The computer readable medium storing a computer program as defined in claim 13, wherein the computer system is expressed as a commercially available PC, commercially available personal digital assistant, commercially available telephone, or commercially available home multimedia system (hi-fl, video) or a commercially available Gameboy.

* * * * *

UNITED STATES PATENT AND TRADEMARK OFFICE
CERTIFICATE OF CORRECTION

| | |
|---|---|
| PATENT NO. | : 7,218,762 B2 |
| APPLICATION NO. | : 10/369960 |
| DATED | : May 15, 2007 |
| INVENTOR(S) | : Oischewski |

It is certified that error appears in the above-identified patent and that said Letters Patent is hereby corrected as shown below:

Col 8, line 30, the words "the components $\bar{I}_i$" should read "the components $I_i$". A corrected version of Claim 7, lines 4 through 33 is presented below.

Should read -

7. A method for user training for a scanning microscope, comprising the steps of:
    a) retrieving a complete spectral scan from a memory of the computer system;
    b) simulating a spectral selection, wherein the user defines several channels from the complete spectral scan;
    c) adjusting a spectral selection means on a real microscope system and the computer system simulates an optical separation of the several channels;
    d) generating and displaying an image for each channel defined by the user; and
    e) repeating the above steps c) through e) until the generated images correspond to an information content determined or desired by the user,
    wherein the simulation is performed on the basis of an SP module, there being displayed to the user, on a display associated with the computer system and an user interface having the standard components of the operating software for the SP module, wherein an interactive selection means depicted in the user interface are embodied as mirror sliders with which a band can be optically separated and displayed and wherein an optical separation is simulated by the computer system by generating for each desired channel a vector $\vec{I}_{Kanal}$ having the dimensionality of the high-quality spectral intensity vector $\vec{I}$, the components $I_i$ of the spectral intensity vector $\vec{I}_{Kanal}$ that lie in the separated band being set equal to one.

UNITED STATES PATENT AND TRADEMARK OFFICE
CERTIFICATE OF CORRECTION

PATENT NO. : 7,218,762 B2
APPLICATION NO. : 10/369960
DATED : May 15, 2007
INVENTOR(S) : Oischewski It is certified that error appears in the above-identified patent and that said Letters Patent is hereby corrected as shown below:

Col 10, line 31, the word "hi-fl" should read"hi-fi". A corrected version of Claim 14, lines 26 to 32 is presented below.

Should read -

14. The computer readable medium storing a computer program as defined in Claim 13, wherein the computer system is expressed as a commercially available PC, commercially available personal digital assistant, commercially available telephone, or commercially available home multimedia system (hi-fi, video) or a commercially available Gameboy.

Signed and Sealed this

Twenty-eighth Day of August, 2007

JON W. DUDAS
*Director of the United States Patent and Trademark Office*